US007721039B2

(12) United States Patent  
Irisa

(10) Patent No.: US 7,721,039 B2  
(45) Date of Patent: May 18, 2010

(54) SYSTEM BUS CONTROL APPARATUS, INTEGRATED CIRCUIT AND DATA PROCESSING SYSTEM

(75) Inventor: Naoki Irisa, Yamatokoriyama (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 457 days.

(21) Appl. No.: 11/651,005

(22) Filed: Jan. 9, 2007

(65) Prior Publication Data

US 2007/0180179 A1    Aug. 2, 2007

(30) Foreign Application Priority Data

Jan. 30, 2006    (JP) .............................. 2006-021115

(51) Int. Cl.  
    *G06F 13/40*    (2006.01)
(52) U.S. Cl. ..................... 710/307; 710/66; 710/243
(58) Field of Classification Search ................ 710/307, 710/66, 243  
    See application file for complete search history.

(56) References Cited

U.S. PATENT DOCUMENTS

| 5,867,672 | A * | 2/1999 | Wang et al. ................. 710/307 |
| 5,930,484 | A * | 7/1999 | Tran et al. ................... 710/107 |
| 5,936,953 | A * | 8/1999 | Simmons .................... 370/364 |
| 6,535,939 | B1 * | 3/2003 | Arimilli et al. .............. 710/116 |
| 6,581,115 | B1 * | 6/2003 | Arimilli et al. .............. 710/107 |
| 6,631,432 | B1 * | 10/2003 | Yamagishi ................... 710/107 |
| 7,174,411 | B1 * | 2/2007 | Ngai ........................... 710/316 |
| 2005/0228932 | A1 * | 10/2005 | Chen et al. .................. 710/307 |
| 2006/0034295 | A1 * | 2/2006 | Cherukuri et al. ......... 370/395.52 |
| 2006/0098675 | A1 * | 5/2006 | Okuno ........................ 370/412 |
| 2006/0259665 | A1 * | 11/2006 | Agarwala et al. ............. 710/62 |
| 2007/0067548 | A1 * | 3/2007 | Juenger ....................... 710/315 |

FOREIGN PATENT DOCUMENTS

| JP | 5-282242 A | 10/1993 |
| JP | 9-319699 A | 12/1997 |
| JP | 11-345196 A | 12/1999 |
| JP | 2004-110224 A | 4/2004 |

* cited by examiner

*Primary Examiner*—Mark Rinehart  
*Assistant Examiner*—Nimesh G Patel  
(74) *Attorney, Agent, or Firm*—Birch, Stewart, Kolasch & Birch, LLP

(57) ABSTRACT

The present invention provides a system bus control apparatus that effectively utilizes a system bus to the full and realizes efficient data transfer.

A system bus control apparatus includes a system bus that is a path of data transferred from a bus master, a bus condition monitoring section that monitors a used condition or unused condition of the system bus, a bus allocating section that allocates a bus width permitted to be transferred by the bus master based on the used condition or unused condition of the system bus monitored by the bus condition monitoring section, when the bus master issues a transfer request, and a bus width variable section that changes the bus width of the data transferred from the bus master in accordance with the allocated bus width.

Accordingly, the bus width of the data to be transferred is changed in accordance with the bus width permitted to be used, whereby the transfer request is not brought into a stand-by condition.

10 Claims, 10 Drawing Sheets

|  | | 1 | 2 | 3 | 4 | 5 | 6 | 7 | 8 | 9 | 10 | 11 | 12 |
|---|---|---|---|---|---|---|---|---|---|---|---|---|---|
| | 8bit | A1 | A2 | A3 | A4 | A5 | A6 | A7 | A8 | D1 | D5 | | |
| System bus | 8bit | C1a | C1b | C2a | C2b | C3a | C3b | C4a | C4b | D2 | D6 | | |
| (32bit) | 8bit | B1 | B2 | B3 | B4 | B5 | B6 | B7 | B8 | D3 | D7 | | |
| | 8bit | | | | | | | | | D4 | D8 | | |

Fig.5

|  | | 1 | 2 | 3 | 4 | 5 | 6 | 7 | 8 | 9 | 10 | 11 | 12 |
|---|---|---|---|---|---|---|---|---|---|---|---|---|---|
| | 8bit | A1 | A2 | A3 | A4 | A5 | A6 | A7 | A8 | E5 | E6 | E7 | E8 |
| System bus | 8bit | | | | | E1 | E2 | E3 | E4 | | | | |
| (32bit) | 8bit | B1 | B2 | B3 | B4 | | | | | B7 | B8 | | |
| | 8bit | | | | | B5a | B5b | B6a | B6b | | | | |

Fig.6

SYSTEM BUS CONTROL APPARATUS, INTEGRATED CIRCUIT AND DATA PROCESSING SYSTEM

CROSS-REFERENCE TO RELATED APPLICATION

This application is related to Japanese Patent Application No. 2006-021115 filed on Jan. 30, 2006, whose priorities are claimed under 35 USC §119, the disclosure of which is incorporated by reference in its entirety.

BACKGROUND OF THE INVENTION

1. Field of the Invention

The present invention relates to a system bus control apparatus, an integrated circuit, and a data processing system that effectively utilize a system bus for realizing an efficient data transfer.

2. Description of Related Art

There has already been known a technique of performing a bus arbitration in order to carry out an efficient data transfer by effectively utilizing a system bus of an LSI, system bus of a personal computer or image processing apparatus, or system bus of various data processing apparatuses. For example, Japanese Unexamined Patent Publication No. 11(1999)-345196 discloses a technique in which an address/data bus is divided into plural bit widths, and among address values for every plural blocks, only the address value of a changed block is transferred. Japanese Unexamined Patent Publication No. 09(1997)-319699 discloses a technique in which a system bus is divided into plural bits and can be asynchronously used. Japanese Unexamined Patent Publication No. 5(1993)-282242 discloses a technique in which a bus is divided into plural bus line units and the bus is used so as to correspond to the data transfer amount to thereby enhance an efficiency of use of the bus. Japanese Unexamined Patent Publication No. 2004-110224 discloses a technique in which a data bus is divided into predetermined bus widths, a right to use the bus is provided to each data bus, and an arbitration is made in such a manner that the right to use the divided bus is issued in response to a data transfer request.

The technique disclosed in Japanese Unexamined Patent Publication No. 11(1999)-345196 can increase transfer speed. The technique disclosed in Japanese Unexamined Patent Publication No. 09(1997)-319699 enables asynchronous transfer. The technique disclosed in Japanese Unexamined Patent Publication No. 5(1993)-282242 can more efficiently use a bus since a bus is divided into plural bus lines. The technique disclosed in Japanese Unexamined Patent Publication No. 2004-110224 enables to use the bus divided, i.e., a half of the bus is used as a transmitter and the other half of the bus is used as a receiver.

However, when a bus width of transfer-requested data is greater than a bus width that is allowed to be used, data transfer is impossible, and hence, the data transfer should be brought into a stand-by condition.

FIG. 13 is a timing chart for explaining a case where the bus width of the transfer-requested data is greater than the bus width that is allowed to be used, and hence, the data transfer is brought in a stand-by condition. The vertical direction of the chart shown in FIG. 13 represents a bus width of a system bus, while the lateral direction of the chart represents a transfer timing. FIG. 13 represents that there are four system buses having a bus width of 8-bit unit. FIG. 13 shows that a bus master A (8-bit) and a bus master B (16-bit) carry out a data transfer from the timing t1 to the timing t8. In this case, the 8-bit bus width is free.

When a transfer request of 16-bit data is issued from a bus master C during the period from the timing t1 to the timing t8, the bus master C should wait to carry out the data transfer until the transfer from the bus master A or bus master B is completed, since there is only an 8-bit free bus width in the system bus. Since a 16-bit free bus width is generated in the system bus after the transfer from the bus master A or B is completed, the bus mater C can transfer the data from the timing t9. In the example shown in FIG. 13, a free bus width corresponding to 32 bits is generated in the system bus after the transfer from the bus master A or B is completed at the timing t9, but a bus width corresponding to 16 bits is used and another bus width corresponding to 16 bits is free.

SUMMARY OF THE INVENTION

The present invention is accomplished in view of the circumstances in which, even if the system bus has a free bus, a data transfer should be waited when its bus width is smaller than the bus width of the transfer-requested data, or in which even if there is a free bus in the system bus, only the bus corresponding to the bus width of the transfer-requested data is used. Specifically, the present invention provides a system bus control apparatus that enables a data transfer even if the bus width of transfer-requested data is greater than the bus width that is allowed to be used. Further, the present invention provides a system bus control apparatus that enables a data transfer by using the usable great bus width when the bus width that is allowed to be used is greater than the bus width of the transfer-requested data.

Thus, the present invention aims to provide a system bus control apparatus that effectively utilizes a system bus for realizing an efficient data transfer.

In order to solve the above problem, a system bus control apparatus according to the present invention includes: a system bus that is a path of data transferred from a bus master; a bus condition monitoring section that monitors a used condition or unused condition of the system bus; a bus allocating section that allocates a bus width permitted to be transferred by the bus master based on the used condition or unused condition of the system bus monitored by the bus condition monitoring section, when the bus master issues a transfer request; and a bus width variable section that changes the bus width of the data transferred from the bus master in accordance with the allocated bus width. Accordingly, the bus width of the data to be transferred is changed in accordance with the bus width that is allowed to be used, whereby the transfer request is not brought into a stand-by condition.

BRIEF DESCRIPTION OF THE DRAWINGS

FIG. 5 is a timing chart of a combined transfer according to the system bus control apparatus of the present invention;

FIG. 6 is a timing chart of a priority transfer according to the system bus control apparatus of the present invention;

DESCRIPTION OF THE PREFERRED EMBODIMENTS

Figure 1:
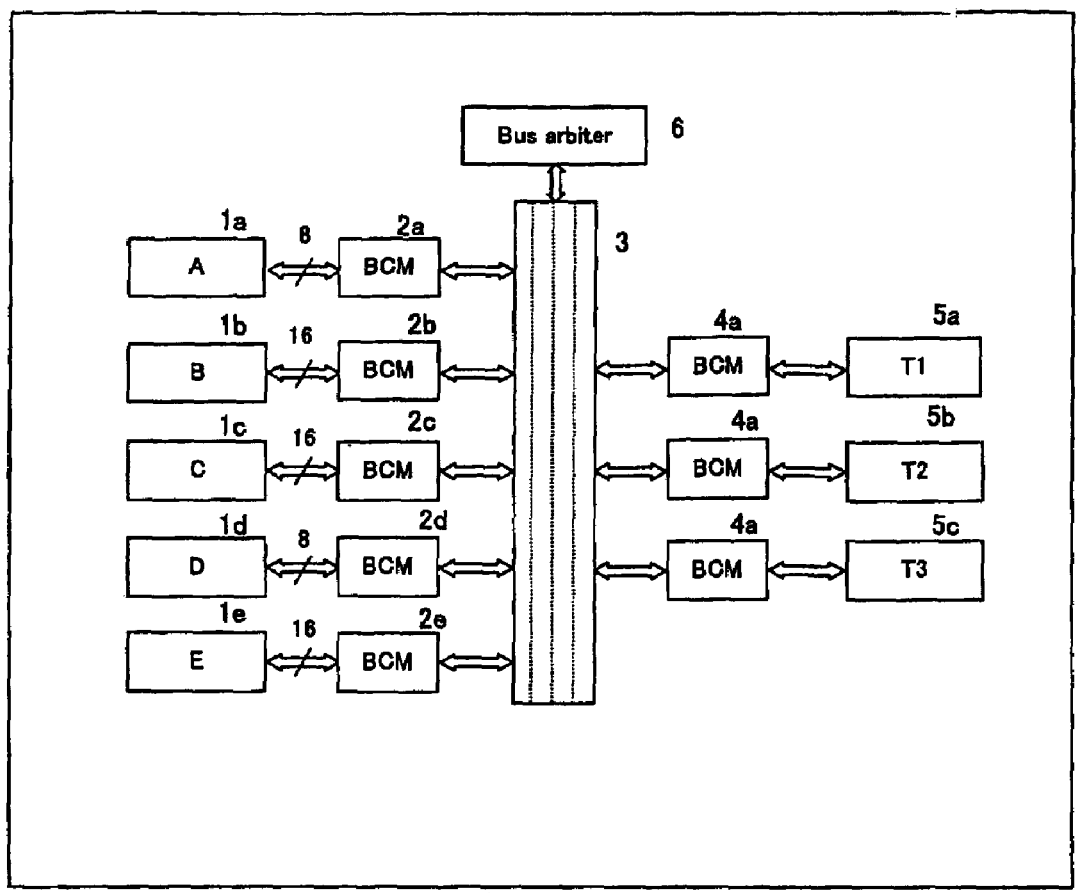
FIG. 1 is a block diagram of a system bus control apparatus according to the present invention.

In a system bus control apparatus according to the present invention, it is preferable that the bus condition monitoring section detects the used condition or unused condition of each bus of the system bus, or holds the used condition or unused condition of the system bus from the bus width and amount of the data that is requested to be transferred by the bus master. Accordingly, the transfer-requested data can be transferred so as to correspond to the used condition or the unused condition of the system bus.

In a system bus control apparatus according to the present invention, it is preferable that the bus width variable section has a function of dividing the data from the bus master in accordance with the allocated bus width when the bus width of the data requested to be transferred by the bus master is greater than the bus width allocated by the bus allocating section, and of combining the data from the bus master in accordance with the allocated bus width when the bus width of the data requested to be transferred by the bus master is smaller than the bus width allocated by the bus allocating section, Accordingly, the transfer request is not brought into a stand-by condition.

A system bus control apparatus according to the present invention preferably further includes a data storage section that stores data when the data requested to be transferred by the bus master cannot be transferred, wherein when the bus condition monitoring section detects a bus not in use in an event that the data is stored in the data storage section, or when the bus condition monitoring section deduces a bus not in use from the held used condition or unused condition, the bus width variable section changes the bus width of the data stored in the data storage section so as to agree with a bus width corresponding to the bus width not in use. Accordingly, when the whole system bus is used, the data is temporarily stored in the buffer, while, when the bus is brought into a usable state, the data is combined according to the usable bus width, whereby the transfer time can be shortened.

In a system bus control apparatus according to the present invention, it is preferable that the bus width allocated by the bus allocating section is a fractional multiple of 2 or 1/(two factorial) of the bus width of the data requested to be transferred. Accordingly, an odd sum of free bus is not created.

In a system bus control apparatus according to the present invention, it is preferable that the bus condition monitoring section has a completion expecting section that calculates an expected completion timing of the data transfer from the bus width and the amount of the data requested to be transferred by the bus master. Accordingly, the system bus can be used systematically.

In a system bus control apparatus according to the present invention, it is preferable that, when a transfer request having a high order of priority is issued from the bus master, the bus allocating section reduces the bus width of the data currently being transferred by the bus width of the transfer-requested data having the high order of priority, and allocates the system bus to the bus master issuing the transfer request having the high order of priority. Accordingly, the performance of the system can be enhanced.

The order of priority is preferably allocated beforehand to the bus master or to the bus width variable section corresponding to the bus master. Accordingly, transfer is performed in accordance with the order of priority.

Further, the order of priority is preferably allocated depending upon the amount of the data requested to be transferred by the bus master. Accordingly, the data can be transferred sequentially in the order of the data amount.

From a different point of view, the present invention provides an integrated circuit including: a system bus that is a path of data transferred from a bus master; a bus condition monitoring section that monitors a used condition or unused condition of the system bus; a bus allocating section that allocates a bus width to be permitted to be transferred by the bus master based on the used condition or unused condition of the system bus monitored by the bus condition monitoring section, when the bus master issues a transfer request; and a bus width variable section that changes the bus width of the data transferred from the bus master in accordance with the allocated bus width. Accordingly, the system bus control apparatus can be obtained as an integrated circuit.

Further, from another different point of view, the present invention provides a data processing system including: a system bus that transfers data; plural bus masters that are connected to the system bus, and have a buffer temporarily storing the data to be transferred and a bus width variable section changing a bus width; and a bus arbiter that is connected to the system bus, and has a bus condition monitoring section monitoring a used condition or unused condition of the system bus and a bus allocating section allocating a bus width permitted to be transferred by the bus master based on the used condition or unused condition of the system bus monitored by the bus condition monitoring section when the bus master issues a transfer request.

According to the present invention, when there is a free space in the system bus, the bus width of transfer-requested data is changed in accordance with the bus width of the free bus, whereby all buses can effectively be used. Therefore, the transfer-requested data is not brought into a stand-by condition, or the stand-by time can be shortened. As a result, the system bus is effectively used, and an efficient data transfer is realized.

Further, the data to be transferred having a higher order of priority can be transferred in preference to the data having a lower order of priority.

The present invention provides a system bus control apparatus that effectively utilizes a system bus of an LSI formed by an ASIC technique, a system bus of a personal computer or an image forming apparatus, or a system bus of various data processing apparatuses for efficiently transferring data.

The present invention will be explained below with reference to a block diagram of FIG. 1 in which the system bus control apparatus of the present invention is applied to an LSI.

As shown in FIG. 1, a bus master 1 is connected to a system bus 3 via a bus-master-side control section 2. There are plural bus masters 1 and plural bus-master-side control sections 2. FIG. 1 shows five bus masters 1 and five bus-master-side control sections 2. The number of the bus mater 1 and the bus-master-side control section 2 may be not less than five or not more than five. When each of the bus masters 1 and bus-master-side control sections 2 is separately explained, subscripts a to e are added.

Each of the bus masters 1*a* and 1*d* transmits or receives an 8-bit data signal, and respectively connected to the bus-master-side control sections 2*a* and 2*d* via an 8-bit data line. Each of the bus masters 1*b*, 1*c* and 1*e* transmits or receives a 16-bit data signal, and respectively connected to the bus-master-side control sections 2*b*, 2*c* and 2*e* via a 16-bit data line.

The system bus 3 is connected to a target 5 via a target-side control section 4. There are plural target-side control sections 4 and plural targets 5. FIG. 1 shows three target-side control sections 4 and three targets 5. The number of the target-side control section 4 and the target 5 may be not less than three or not more than three.

Although only the system bus 3 for data transfer is shown in FIG. 1, and an address line and command line are not shown in FIG. 1, the address line and command line are separately provided for connecting the bus-master-side control sections 2 and the target-side control sections 4.

A bus arbiter 6 is connected to the system bus 3. The bus-master-side control sections 2 and the target-side control sections 4 will be explained later with reference to FIG. 2, and the bus arbiter 6 will be explained later with reference to FIG. 3.

The bus master 1 is, for example, a CPU, an input section or output section of a DMA controller, or a RAM. The CPU can directly read or write data of the target. The DMA controller is a module that controls data transfer between the targets instead of the CPU. These are bi-directional devices that input or output data, and preferably composed of the DMA.

The target 5 is a device that receives an address or command from the bus master 1 and decodes the received address or command. An external memory storage device such as a hard disk, ROM, or RAM, or a device such as an I/O is connected to the outside of the target 5. The section encircled by a frame in FIG. 1 shows a configuration in the LSI or board. The LSI may be composed in such a manner that at least some of the bus masters 1 and targets 5 may not be included depending upon the size of the LSI.

The command and data transmitted from the bus master 1 are transmitted to the target 5 via the bus-master-side control section 2, system bus 3 and target-side control section 4. The target 5 inputs data and holds the data at a designated address when the command from the bus master 1 is a write command. If the command from the bus master 1 is a read command, the target 5 outputs the data at the designated address to the bus master.

Alternatively, the command and data from one of the bus masters 1 are transmitted to another bus master 1 via the system bus 3. The target 5 only receives data from the bus master 1 in general.

Figure 2:
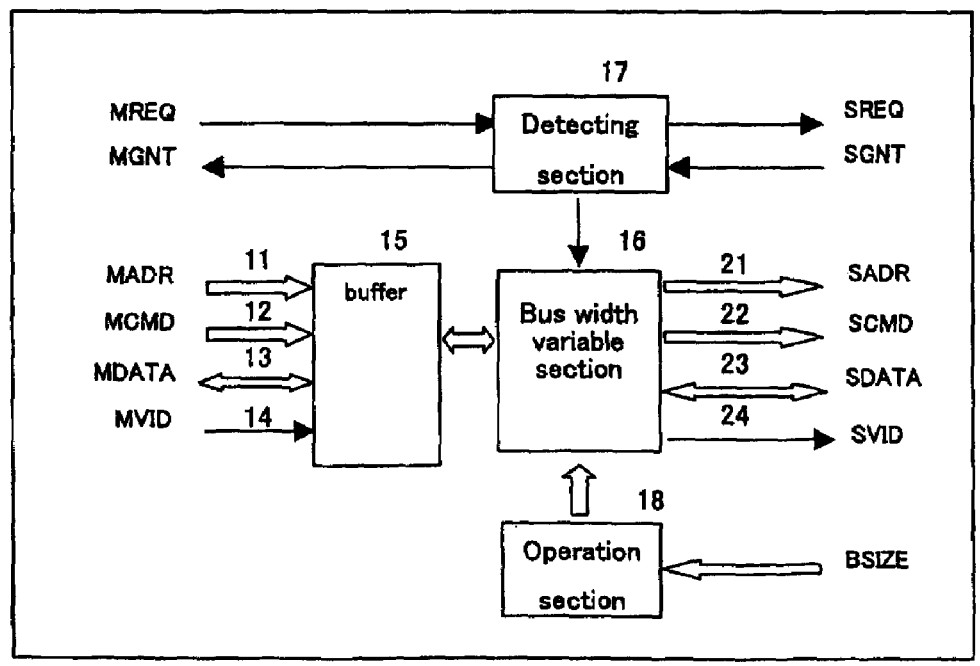
FIG. 2 is a block diagram of a bus-master-side control section constituting the system bus control apparatus according to the present invention.

FIG. 2 is a block diagram of the bus-master-side control section 2. The bus master-side control section 2 includes an address line 11 that receives an address signal MADR from the bus master 1, a command line 12 that receives a command signal MCMD including a bus width and data amount (or the number of burst) of the transfer-requested data from the bus master 1, a data line 13 that transmits or receives a data signal MDATA from the bus master 1, and an effective signal line 14 that receives an effective signal MVLD from the bus master 1. The respective lines are connected to a buffer 15. The buffer 15 has a capacity for storing the signal received from each line or signal transmitted to each line in an amount of a unit burst (e.g., 8 bursts). The buffer 15 is further connected to a bus width variable section 16. The bus width variable section 16 has an address line 21 that transmits an address signal SADR to the target 5, a command line 22 that transmits a command signal SCMD to the target 5, a data line 23 that transfers a data signal SDATA via the system bus 3, and an effective signal line 24 that transmits an effective signal SVLD to the target 5. These lines 21 to 24 are connected to the system bus 3.

The bus width variable section 16 has a function of dividing or combining the bus width to change the bus width of the data transmitted from the bus master 1 so as to correspond to a bus size signal BSIZE commanded from the bus arbiter 6. For example, the data of 16-bit width transmitted from the bus master 1 is divided into 2 cycles of 8-bit width each. The data width variable section 16 combines two 8-bit width data to form data having a 16-bit width. In a case of combining data, the data is combined in such a manner that the bit width of the data transmitted from the bus master 1 becomes a factorial multiple or integral multiple of 2. The data is divided in such a manner that the bit width of the data transmitted from the bus master 1 becomes 1/(2 fractional). Further, the bus width variable section 16 is connected to a detecting section 17 that detects a transfer request MREQ from the bus master 1 and outputs a transfer request SREQ to the bus arbiter 6. Further, the detecting section 17 detects a transfer permission signal SGNT from the bus arbiter 6 and outputs a transfer permission signal MGNT to the bus master 1.

Moreover, the bus width variable section 16 is connected to an operation section 18 that receives a permission size signal BSIZE from the bus arbiter 6 and operates whether the bus width of the data transmitted from the bus master 1 is divided or combined.

The above is the description for the bus-master-side control section 2. The target-side control section 4 has a same configuration. It is to be noted that, instead of the bus master 1, the target 5 is connected to the target-side control section 4 to process data between the target 5 and the system bus 3.

Figure 3:
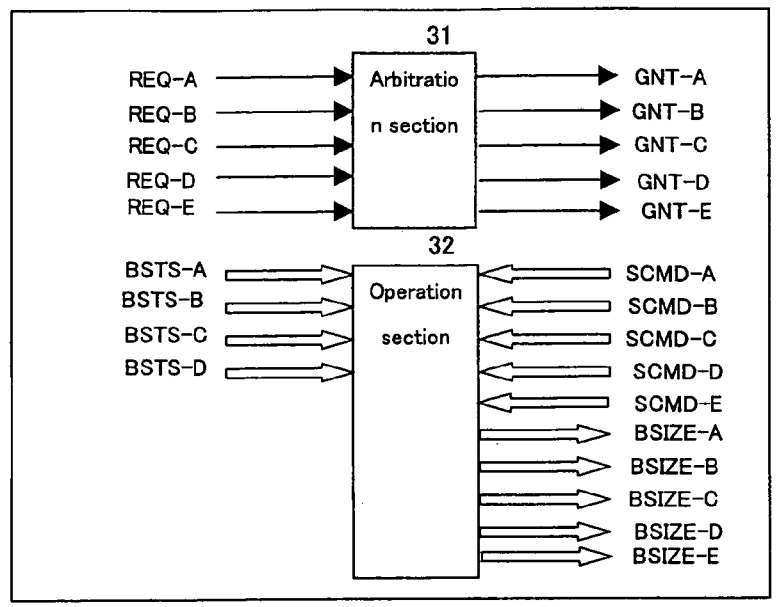
FIG. 3 is a block diagram of a bus arbiter constituting the system bus control apparatus according to the present invention.

FIG. 3 is a block diagram of the bus arbiter 6. As shown in FIG. 3, the bus arbiter 6 includes an arbitration section 31 and an operation section 32. The arbitration section 31 is connected to each of the bus-master-side control sections 2*a* to 2*e* and receives transfer request signals REQ-A to REQ-E respectively from the bus-master-side control sections 2*a* to 2*e*. A to E represent signals that are to be transmitted to or received from the bus masters 1*a* to 1*e*. The same is true for the following explanation. The transfer request signals REQ-A to REQ-E correspond to the transfer requests SREQ of each of the bus-master-side control sections 2 shown in FIG. 2. The arbitration section 31 communicates with the operation section 32 to perform bus arbitration, and as a result of the arbitration, transmits, to each of the bus-master-side control section 2*a* to 2*a*, bus use-permission signals GNT-A to GNT-E. The use-permission signals GNT-A to GNT-E correspond to the transfer permission signals SGNT of each of the bus-master-side control sections 2 shown in FIG. 2.

When the arbitration section 31 receives the transfer request signals REQ-A to REQ-E, the operation section 32 checks conditions of the buses A to D by status signals BSTS-A to BSTS-D. This checking is referred to as monitoring or monitor section in the claims. Checking the condition of each of the buses A to D means the system bus 3 is divided into four and the used condition or unused condition of each of the divided bus is detected. Further, checking the condition of each of the buses A to D is to hold the used condition or unused condition of the buses from the bus width and data amount (or the number of burst) of the data is allowed to be transferred by the bus arbiter 6. The used condition or unused condition of the buses is held as described above, whereby the projected use of the system bus can be formed. Since the system bus 3 is divided into four by 8 bits each, there are four status signals BSTS-A to BSTS-D in this embodiment, but the number of the status signals varies depending upon the size of the system bus or the bus width to be divided.

The operation section 32 receives command signals SCMD-A to SCMD-E from each of the bus-master-side control sections 2a to 2e. The command signals SCMD-A to SCMD-E correspond to the command signal SCMD of the bus-master-side control sections 2 shown in FIG. 2, and include information on the bus width and data amount. The operation section 32 operates the bus width of the data when the data is allowed to be transferred, from the bus width and the data amount included in the command signals SCMD-A to SCMD-E and the status signals BSTS-A to BSTS-D indicating the used condition or unused condition of each bus. In this operation, the position of the bus to be used is obtained as well as the bus width. The result of the operation is given to the bus-master-side control section 2 requesting transfer of the transfer-permission bus width signals BSIZE-A to BSIZE-E, together with the bus use-permission signals GNT-A to GNT-E. Operating the bus width of the data allowed to be transferred and transmitting the transfer-permission bus width signals are referred to as allocating a bus width or a bus allocating section in the claims.

The transfer-permission bus width signals BSIZE-A to BSIZE-E correspond to the permission size signals BSIZE of the bus-master-side control section 2 shown in FIG. 2. The use-permission signals GNT-A to GNT-E and the transfer-permission bus width signals BSIZE-A to BSIZE-E may be transmitted not only to the bus-master-side control section 2 requesting transfer but also to the target-side control section 4 as the transfer destination. Alternatively, the bus-master-side control section 2 receiving a transfer permission may transfer the use-permission signals GNT-A to GNT-E and the transfer-permission bus width signals BSIZE-A to BSIZE-E to the target-side control section 4 as the transfer destination or to the bus-master-side control section 2 as is the transfer destinations. The bus arbiter 6 may include not only the use-permission signals GNT-A to GNT-E and the transfer-permission bus width signals BSIZE-A to BSIZE-E but also data amount (or the number of burst) and positional signal of the bus line.

The bus system control apparatus according to the present invention is configured as described above, and operates as follows.

Figure 4:
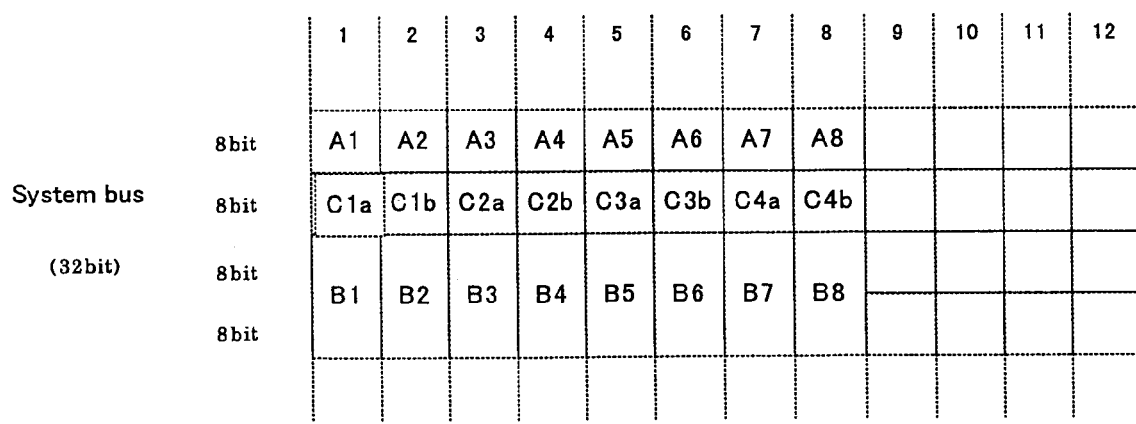
FIG. 4 is a timing chart of a division transfer according to the system bus control apparatus of the present invention.

FIG. 4 shows a timing when the data is transferred with a bus width divided by the system bus control apparatus according to the present invention. FIG. 4 shows that, when there are four 8-bit unit system buses, data of the bus master 1a (8 bits) and bus master 1b (16 bits) are transferred from a timing t1 to a timing t8. In FIG. 4, the data of the bus master 1a is represented by A1 to A8, and the data of the bus master 1b is represented by B1 to B8. The same is true for the following explanation.

When a transfer request of 16-bit data is issued from the bus master 1c during a period from the timing t1 to the timing t8, the bus arbiter 6 gives a transfer permission to the bus master 1c since the system bus 3 has an 8-bit free space. It is to be noted that the bus width of the data permitted to be transferred is 8 bits. Therefore, the data width variable section 16 of the bus master 1c divides the 16-bit data into signals C1a, C1b, C2a, C2b, . . . that are signals of two cycles each having 8 bits.

The use-permission signal GNT-C and the transfer-permission bus width signal BSIZE-C of the bus arbiter 6 and the positional information on the bus line may be transmitted not only to the bus-master-side control section 2c of the bus master 1 but also to the bus master as a transfer destination or the target. Alternatively, they may be transmitted as contained in the command MCMD to be transmitted from the bus master 1c that receives the transfer permission. The data thus divided into 8-bit width is transferred, whereby the free space of the system bus 3 can effectively be utilized. Consequently, an efficiency of use of the system bus can be enhanced.

FIG. 5 shows a timing when the data is transferred with the bus width combined by the system bus control apparatus according to the present invention. FIG. 5 shows that, when there are four 8-bit unit system buses, the bus master 1a (data A having an 8-bit width), the bus master 1b (data B having a 16-bit width), and the bus master 1c (data C having an 8-bit width) respectively transfer data from the timing t1 to the timing t8. When the transfer request of the data D having an 8-bit width is issued from the bus-master-side control section 2d of the bus master 1d during the period from the timing t1 to the timing t8, the bus arbiter 6 issues a stand-by command to the bus-master-side control section 2d of the bus master 1d, since there is no free space in the system bus 3. Alternatively, the bus arbiter 6 may issue a use-permission signal GNT-D, but the transfer-permission bus width signal BSIZE-D at this time indicates permitting a bus width of zero. Therefore, the data from the bus master 1d is temporarily stored in a buffer 15d.

At a timing t9, the data transfer from the bus masters 1a, 1b and 1c is completed, so that a 32-bit free space is obtained. Therefore, the bus arbiter 6 transmits the use-permission signal GNT-D and transfer-permission bus width signal BSIZE-D of 32-bit width to the bus master 1d. Then, the data width variable section 16d of the bus master 1d combines four 8-bit width data to form data having a 32-bit width. In this case, the bus master 1d may not use all of the 32 bits, but may only use 16 bits or 24 bits.

The data is thus combined and transferred as the data having a 32-bit width. Accordingly, the data transfer time can be shortened, whereby an efficient data transfer can be realized.

FIG. 6 shows a case where the system bus control apparatus of the present invention transfers data having a high order of priority for preference. FIG. 6 shows that, when there are four 8-bit unit system buses, data from the bus master 1a (data A having an 8-bit width) and data from the bus master 1b (data B having a 16-bit width) are transferred from the timing t1 to the timing t4. When a transfer request of data having a 16-bit width is issued at the timing t5 from the bus master 1e having a high order of priority, the bus arbiter 6 causes the bus master 1b, having a low order of priority, to reduce the bus width of the transfer-permission bus width signal BSIZE-B from 16 bits to 8 bits, since there is only an 8-bit free space in the system bus 3. Therefore, the bus width variable section 16b of the bus master 1b changes the bus width to 8 bits. Accordingly, the data is transferred with an 8-bit bus width from the timing t5 to the timing t8.

Accordingly, the free bus width becomes 16 bits, whereby the transfer-permission bus width signal BSIZE-B of a 16-bit width is issued to the bus master 1e. As a result, the bus width used by the bus masters 1a and 1b becomes 8 bits, and the bus width used by the bus master 1e becomes 16 bits. Then, at the timing t9, the transfer from the bus master 1a is completed, and thereby the bus masters 1b and 1e restart the data transfer by using the system bus in 16 bits each. In this case, since the position of the bus to be used is changed, the bus arbiter 6 transmits the changed information on the bus position to the bus-master-side control section 2.

In this example, the bus master 1b transfers the data of a 16-bit width as changed to the data of an 8-bit width. However, depending on cases, there may be no free bus width. In such a case, the bus width of the transfer-permission bus width signal BSIZE-B is set to zero for the bus master 1b with the transfer permission given to the bus master 1b. Setting the bus width of the transfer-permission bus width signal BSIZE-B to zero indicates a temporal stop, not a discontinuation of the transfer, to the bus master 1b. When a free bus width is obtained, the transfer is continuously restarted.

When the transfer request is issued from the bus master 1e having a high order of priority during the transfer from the bus masters 1a and 1b, the transfer request from the bus master 1b having a low order of priority frees the bus width necessary for responding to the transfer request from the bus master 1e as described above, whereby a transfer band of the bus master 1e can be ensured. The order of priority may be set beforehand for every bus master or in the bus width variable section of the corresponding bus master. Alternatively, the order of priority may be set depending upon the data amount. When the data amount is too large, the data having a smaller amount may have priority sequentially so that another data having a smaller data amount is transferred for preference. For example, the data is divided by a unit burst (e.g., 8 bursts), and even in this case, the data in which the unit burst is continuous may be determined that the data amount is too large. When a polygon mirror of a laser printer rotates and a photosensitive member is scanned in an image forming apparatus, print data has priority. When the photosensitive member is not scanned, another data may have priority. Alternatively, the data for which the transfer time is determined is transferred for preference at the determined time.

A processing method for realizing the timing in FIG. 4 explained above will be explained with reference to a flowchart of the bus arbiter 6 shown in FIG. 7.

A first step S1 is a step in which the system bus control apparatus detects whether a transfer request is issued or not. Whether the transfer request is issued or not is detected by whether presence of the transfer request signals REQ-A to REQ-E is detected by the arbitration section 31 of the bus arbiter 6. If there is no transfer request, the process returns to the step S1. When the transfer request is issued, the bus arbiter 6 proceeds to a step S2 to check the bus width of the transfer-requested data by the operation section 32 of the bus arbiter 6 using the command signals CMD-A to CMD-E. Then, in a step S3, the operation section 32 checks the current free bus width in the system bus 3 from the status signals BSTS-A to BSTS-D. In a next step S4, it is determined whether the free bus width is greater than the bus width of the transfer-requested data. When the free bus width is greater than the bus width of the transfer-requested data, the transfer is possible. Therefore, in the step S5, the bus master 1 requesting a transfer is given the use-permission signals GNT-A to GNT-E and the transfer-permission bus width signals BSIZE-A to BSIZE-E including the information on the free bus width.

If the free bus width is smaller than the bus width of the transfer-requested data, in a step S6, the bus arbiter 6 gives the transfer permission with the free bus width as the use-permission signals GNT-A to GNT-E together with the transfer-permission bus width signals BSIZE-A to BSIZE-E. The bus width variable section 16 of the bus master 1 receiving the transfer permission with the free bus width divides the data width of the data into the free bus width for performing transfer.

After the transfer is completed as described above, the process returns to the step S1.

Figure 8:
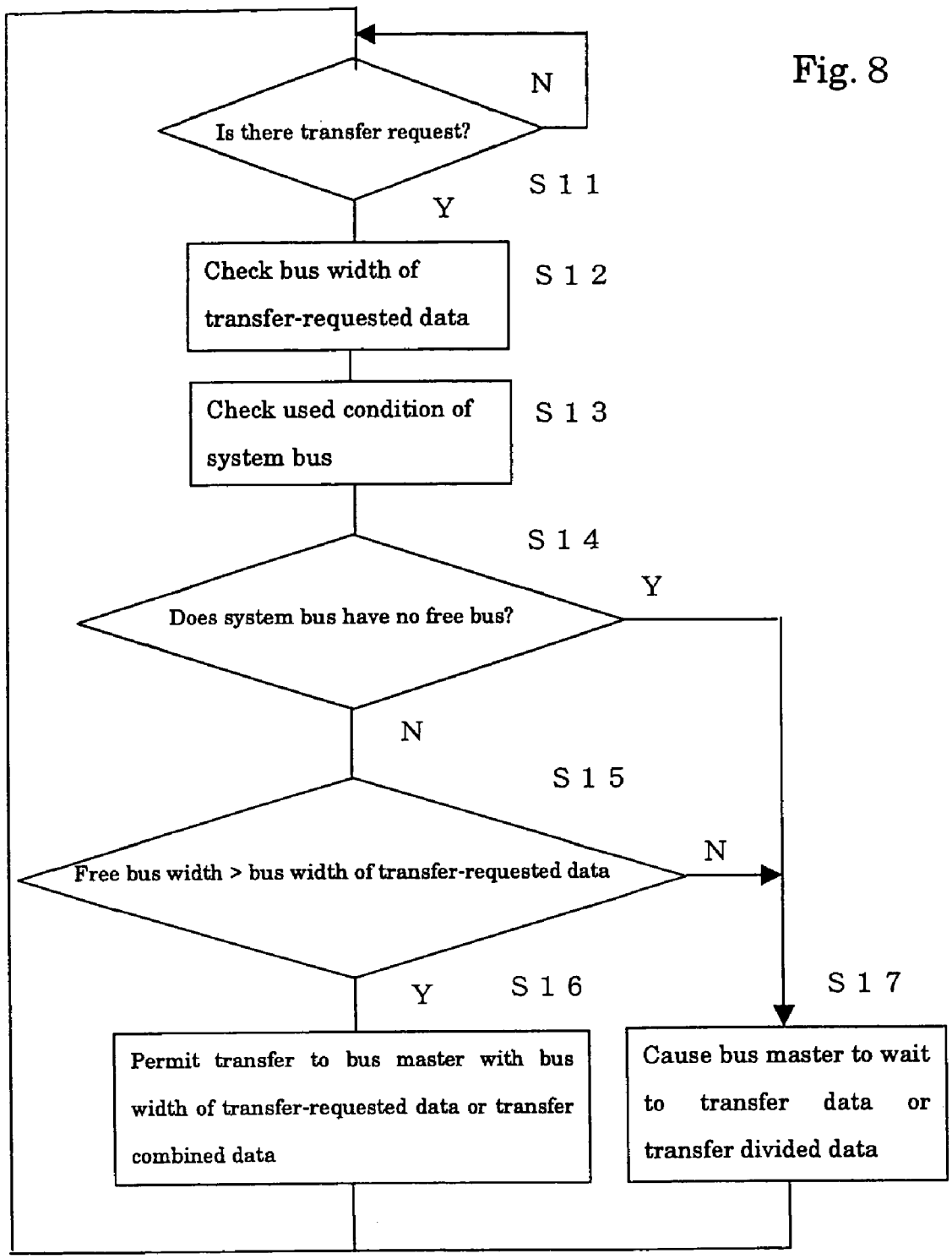
FIG. 8 is a flowchart of a combined transfer according to the system bus control apparatus of the present invention.

The flowchart in FIG. 8 shows a case of the combined transfer shown in FIG. 5.

Figure 7:
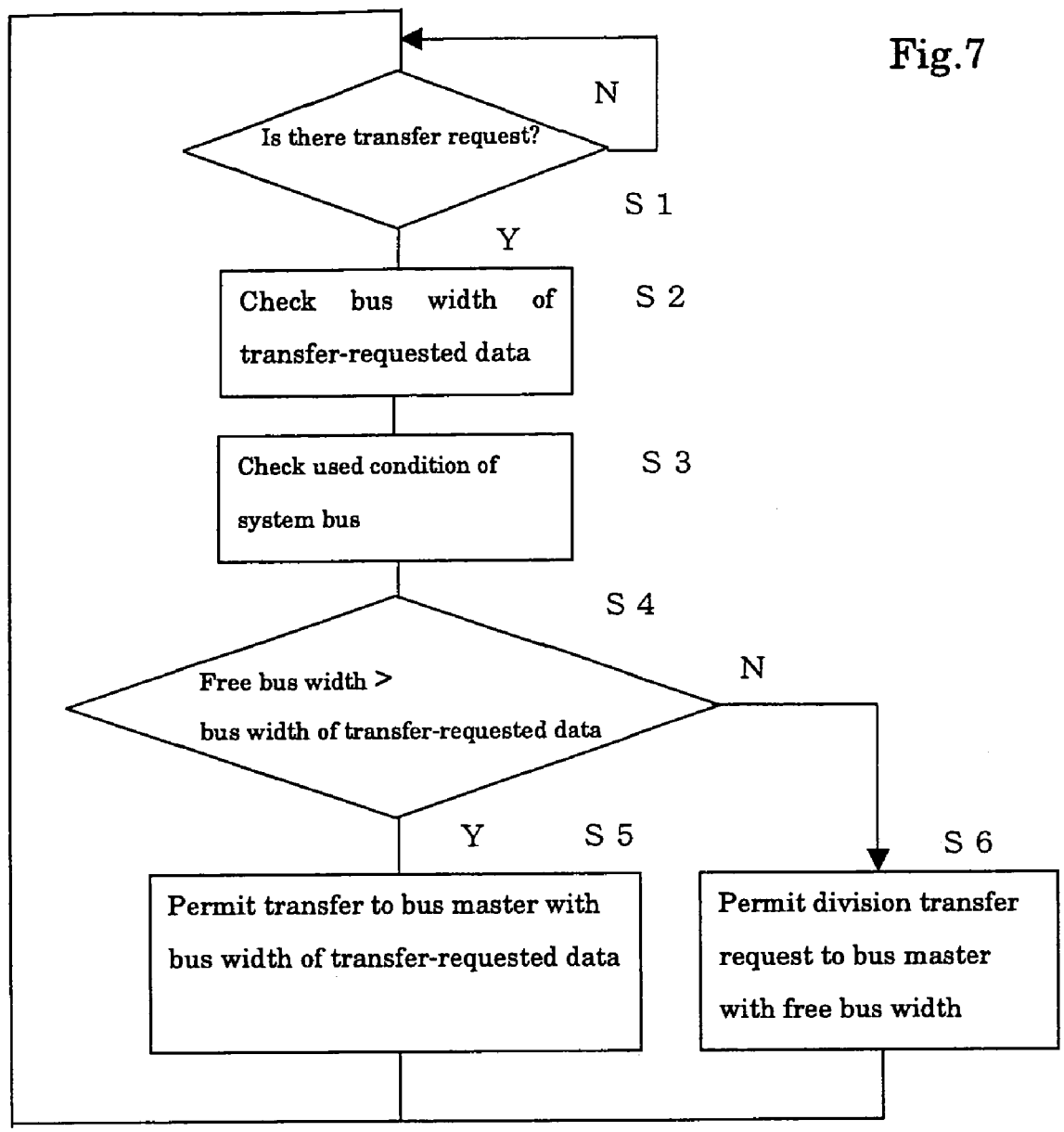
FIG. 7 is a flowchart of a division transfer according to the system bus control apparatus of the present invention.

Steps S11 to S13 are the same as the steps S1 to S3 in FIG. 7.

In a step S14, it is determined whether or not there is a free bus width in the system bus 3. When there is no free bus width, the process proceeds to a step S17. When there is a free bus width in the system bus 3, the process proceeds to a step S15 so as to determine whether the free bus width is greater than the bus width of the transfer-requested data. When the free bus width is greater than the bus width of the transfer-requested data, the transfer is possible. Therefore, in a step S16, the bus arbiter 6 transmits to the bus master requesting transfer is issued the transfer permission for using the free bus width as the use-permission signals GNT-A to GNT-E together with the transfer-permission bus width signals BSIZE-A to BSIZE-E. Accordingly, the bus master combines the bus width so as to match the bus width to the free bus width.

If the free bus width is smaller than the bus width of the transfer-requested data in the step S15, the process proceeds to the step S17 to transmit the transfer permission with the free bus width as the use-permission signals GNT-A to GNT-E together with the transfer-permission bus width signals BSIZE-A to BSIZE-E. Accordingly, the bus master divides the bus width so as to match the free bus width for performing transfer.

Figure 9:
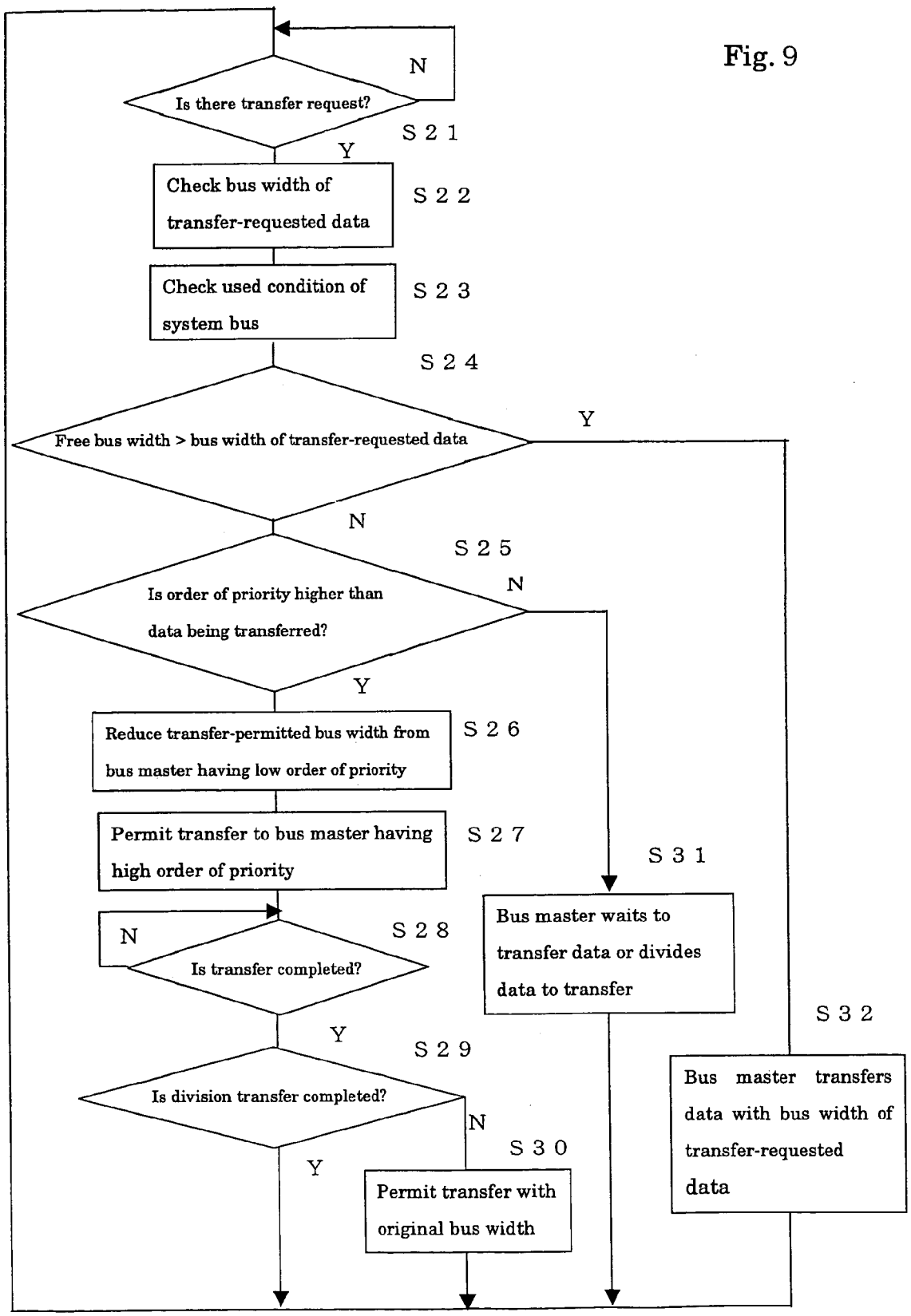
FIG. 9 is a flowchart of a priority transfer according to the system bus control apparatus of the present invention.

The flowchart shown in FIG. 9 shows a case of the priority transfer shown in FIG. 6.

Steps S21 to S24 are the same as the steps S1 to S4 in the flowchart in FIG. 7. When the free bus width is greater than the bus width of the transfer-requested data in the step S24 (Y in S24), the process proceeds to a step S32 to give the transfer permission with the bus width of the transfer-requested data as in a case of the step S5 in FIG. 7.

However, when the free bus width is smaller than the bus width of the transfer-requested data in the step S24 (N in S24), the process proceeds to step S25 to determine whether the order of priority of the data that is newly requested to be transferred is higher than the order of priority of the data currently being transferred. When the order of priority of the data that is newly requested to be transferred is lower (N in S25), a normal transfer is to be carried out. Therefore, the process proceeds to a step S31 to give the transfer permission with the free bus width of the system bus to the bus master requesting the transfer. The bus master to which the transfer permission is given divides the bus width so as to match the transfer permitted bus width for performing transfer.

When the order of priority of the transfer-requested data is higher (Y in S25), the process proceeds to a step S26 to command the bus master having a low order of priority to change the bus width so as to reduce the insufficient bus width when the bus master having a high order of priority transfers data. The commanded bus master divides the bus width in order to change the bus width and carries out the transfer. In a next step S27, the use-permission signals GNT-A to GNT-E and transfer-permission bus width signals BSIZE-A to BSIZE-E are transmitted to the bus master requesting the transfer. It is determined in a next step S28 whether the transfer is completed or not. If the transfer is not completed, the process returns to the step S28. When the transfer is completed, it is determined in a step S29 whether the transfer from the bus master that reduces the bus width is completed or not. If completed (Y in S29), the process returns to step S21. If not completed (N in S29), the process proceeds to step S30 to permit the bus master to transfer with the bus width before being reduced. The bus master receiving the transfer permission with the original bus width changes the bus width to the original bus width and carries out the transfer.

As described above, when the used condition of the system bus is changed according to the completion of the data transfer or new transfer request, the arbitration section 31 and the operation section 32 of the bus arbiter 6 reallocates the use-permitted bus width and bus position, whereby the system bus is effectively utilized and an efficient data transfer can be realized.

Subsequently, the present invention is explained with reference to time charts.

Figure 10:
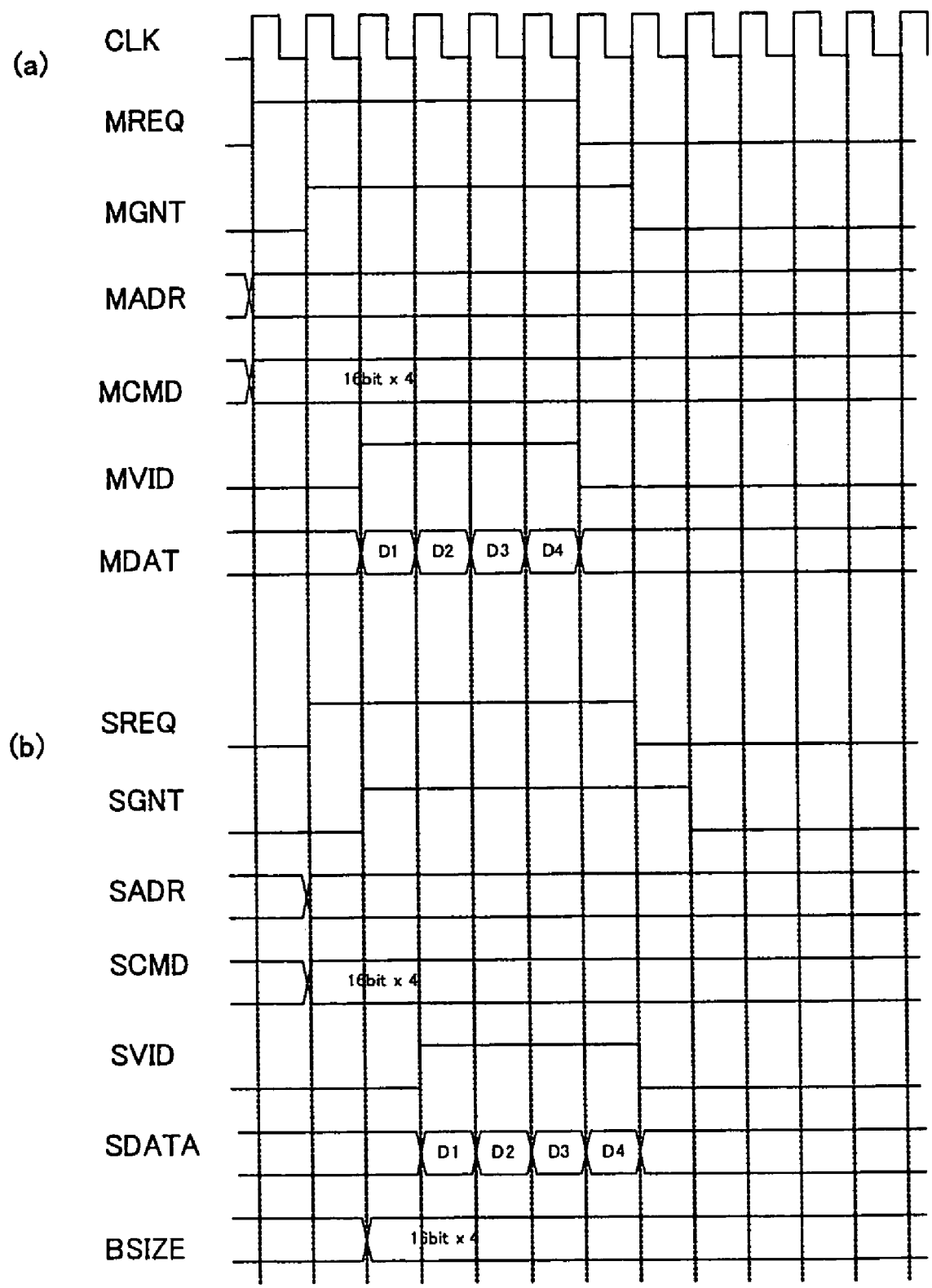
FIG. 10 is a time chart of a normal transfer according to the system bus control apparatus of the present invention.

FIG. 10 shows a time chart in the normal transfer. FIG. 10(a) shows a time chart of the bus master 1, wherein CLK on the first line represents a clock. This clock is common to the whole system bus control apparatus of the present invention. An MREQ on the second line represents a transfer request signal of the bus master 1. A high level thereof indicates that there is a transfer request, while a low level thereof indicates that there is no transfer request. On the third line, MGNT represents a transfer permission signal received from the bus arbiter 6. A high level thereof indicates that the transfer is permitted, while a low level thereof indicates that the transfer is not permitted. On the fourth line, MADR represents an address signal of the bus master 1. On the fifth line, MCMD indicates a command signal of the bus master 1. Here, it indicates that there are four 16-bit data. On the sixth line, MVLD represents an effective period of the transfer permission. A high level thereof indicates the period that the transfer permission is effective, while a low level thereof indicates the period in which there is no transfer permission. On the seventh line, MDATA represents that the bus master executes the data transfer. Accordingly, FIG. 10(a) shows that the transfer permission signal MGNT is given and the transfer is made four times with the use of the 16-bit bus width, when the bus master 1 issues the transfer request signal MREQ.

FIG. 10(b) shows a time chart of the system bus 3 with respect to the transfer request and the execution of the transfer of the bus master shown in FIG. 10(a). On the first line, SREQ represents a transfer request signal from the bus master 1, wherein a high level thereof indicates that there is a transfer request, while a low level thereof indicates that there is no transfer request. On the second line, SGNT represents a transfer permission signal transmitted from the bus arbiter 6. A high level thereof indicates the transfer permission, while a low level thereof indicates no-permission of transfer. On the third line, SADR represents an address signal of the bus master 1. On the fourth line, SCMD represents a command signal of the bus master 1. On the fifth line, SVLD represents an effective period of the transfer permission. A high level thereof indicates the period that the transfer permission is effective, while a low level thereof indicates the period in which there is no transfer permission. On the sixth line, SDATA represents that the bus master 1 executes the data transfer. On the seventh line, BSIZE represents a period that the bus master 1 executes the data transfer. Here, it indicates that 16-bit data is transferred four times. Accordingly, FIG. 10(b) shows that the transfer permission signal SGNT is given and the data transfer is carried out, when the bus master issues the transfer request signal SREQ.

Figure 11:
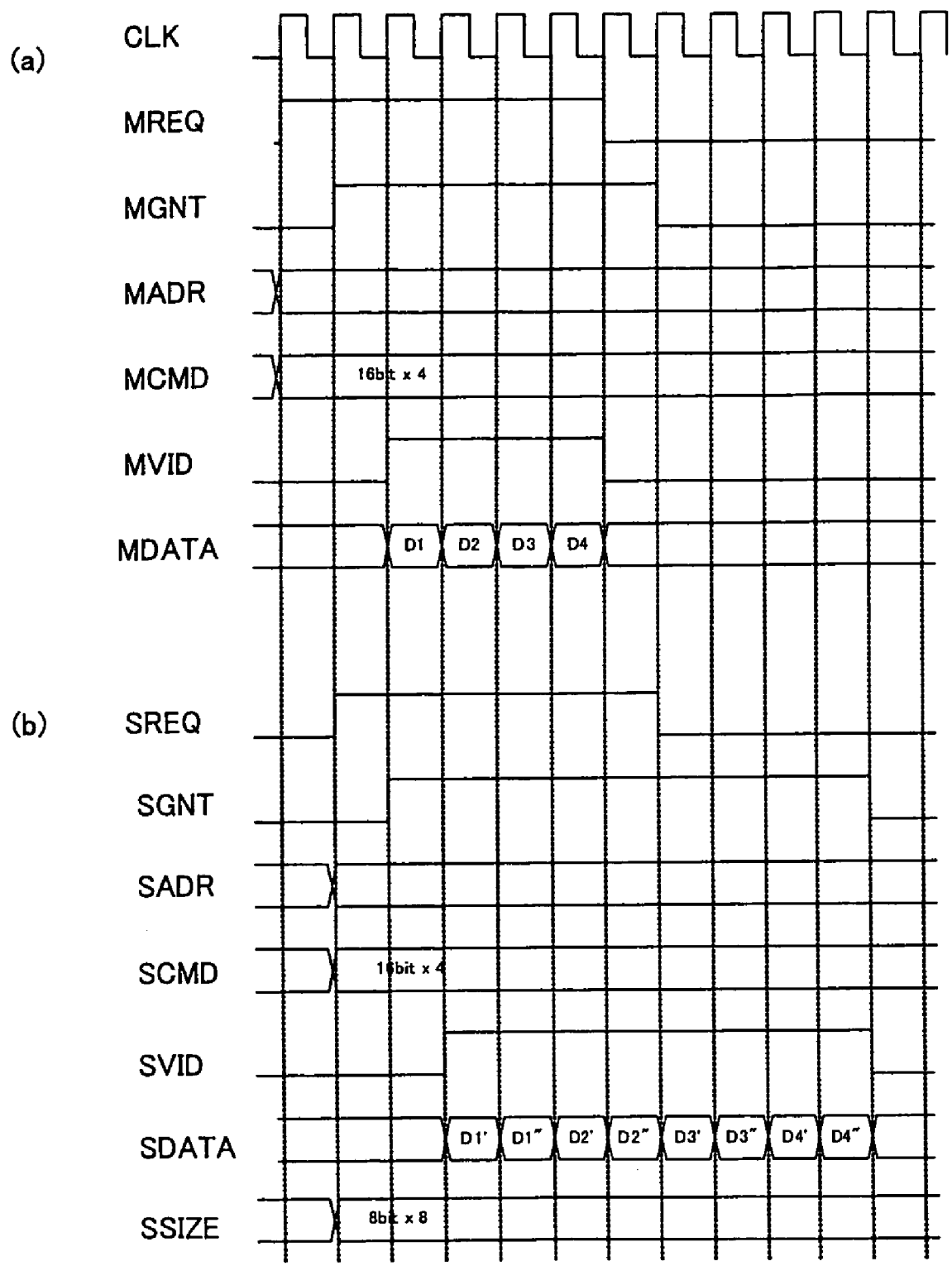
FIG. 11 is a timing chart of a division transfer according to the system bus control apparatus of the present invention.

FIG. 11 shows a time chart of the division transfer.

FIG. 11 is almost the same as FIG. 10. The different points are SVLD on the fifth line, SDATA on the sixth line, and BSIZE on the seventh line in FIG. 11(b). Specifically, the SLVD on the fifth line represents the period of eight clocks. The SDATA on the sixth line shows that the bus width is divided into 8 bits and the data is transferred eight times. The SDATA on the sixth line shows that 8-bit data is transferred eight times.

Figure 12:
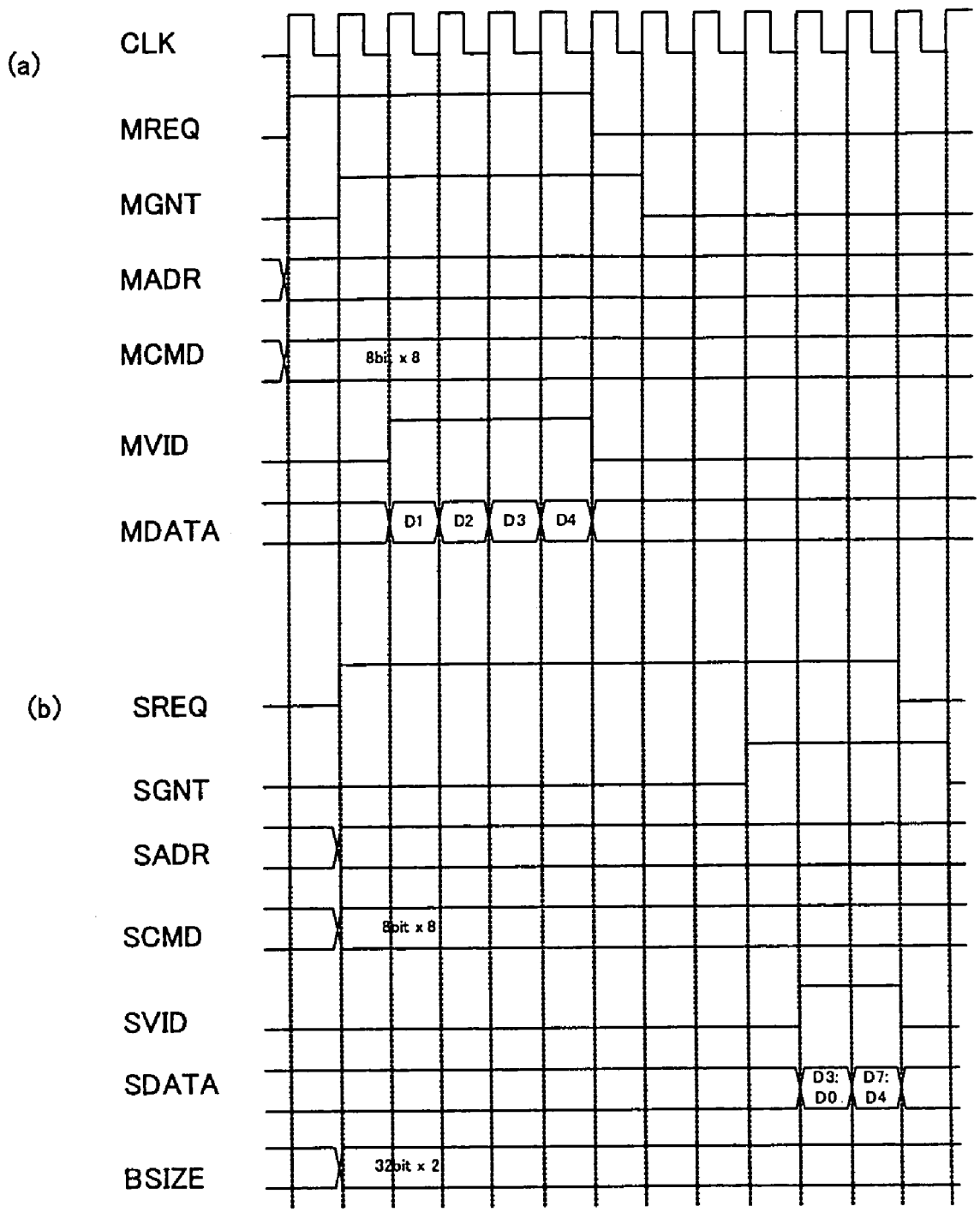
FIG. 12 is a timing chart of a combined transfer according to the system bus control apparatus of the present invention.
Figure 13:
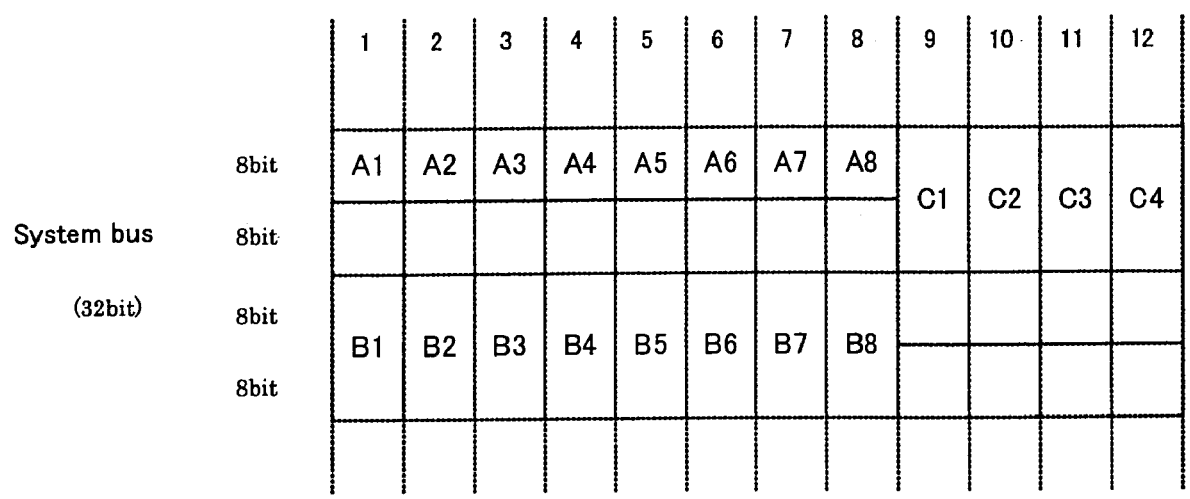
FIG. 13 is a conventional timing chart.

FIG. 12 is a time chart of the combined transfer.

FIG. 12(a) shows a time chart of the bus master, and same as FIG. 10(a) and FIG. 11(a).

FIG. 12(b) shows a time chart of the system bus. On the first line, SREQ represents a transfer request signal from the bus master, wherein a high level thereof indicates that there is a transfer request, while a low level thereof indicates that there is no transfer request. Here, it shows that the transfer request is issued for 11 clocks. On the second line, SGNT represents a transfer permission signal transmitted from the bus arbiter 6. In this case, it shows that there is no free bus width at the beginning of the period when the transfer request is issued, so that the transfer permission signal becomes a low level. Then, it is indicated that the transfer permission signal SGNT is issued at the tenth clock from the issuance of the transfer request. During this period, the bus-master-side control section stores data in the buffer. On the fifth line, SVLD becomes a high level on the tenth clock and eleventh clock from the issuance of the transfer request signal SREQ, showing the period that the transfer permission is effective. On the sixth line, SDATA represents that the bus master combines four 8-bit data to form 32-bit data and transfers the resultant data twice. On the seventh line, BSIZE represents that 32-bit data is transferred twice, indicating a data amount.

The above-mentioned embodiment describes a system bus of an LSI. However, the present invention is applicable to a system bus of a personal computer or image forming apparatus, or a system bus of various data processing apparatuses.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A system bus control apparatus comprising:
    a system bus that is a path of data transferred from a bus master;
    a bus condition monitoring section that monitors a used condition or unused condition of the system bus;
    a bus allocating section that allocates a bus width permitted to be transferred by the bus master based on the used condition or unused condition of the system bus monitored by the bus condition monitoring section, when the bus master issues a transfer request; and
    a bus width variable section that changes the bus width of the data transferred from the bus master in accordance with the allocated bus width,
    wherein
    the bus width variable section has a function of dividing the data from the bus master in accordance with the allocated bus width when the bus width of the data requested to be transferred by the bus master is greater than the bus width allocated by the bus allocating section, and of combining the data from the bus master in accordance with the allocated bus width when the bus width of the data requested to be transferred by the bus master is smaller than the bus width allocated by the bus allocating section.

2. A system bus control apparatus according to claim 1, wherein
    the bus condition monitoring section detects the used condition or unused condition of each bus of the system bus, or holds the used condition or unused condition of the system bus from the bus width and amount of the data that is requested to be transferred by the bus master.

3. A system bus control apparatus according to claim 1, further comprising a data storage section that stores data when the data requested to be transferred by the bus master cannot be transferred, wherein when the bus condition monitoring section detects a bus not in use in an event that the data is stored in the data storage section, or when the bus condition monitoring section deduces a bus not in use from the held used condition or unused condition, the bus width variable section changes the bus width of the data stored in the data storage section so as to agree with a bus width corresponding to the bus width not in use.

4. A system bus control apparatus according to claim 1, wherein the bus width allocated by the bus allocating section is a fractional multiple of 2 or 1/(two factorial) of the bus width of the data requested to be transferred.

5. A system bus control apparatus according to claim 1, wherein the bus condition monitoring section has a completion expecting section that calculates an expected completion timing of the data transfer from the bus width and the amount of the data requested to be transferred by the bus master.

6. A system bus control apparatus according to claim 1, wherein, when a transfer request having a high order of priority is issued from the bus master, the bus allocating section reduces the bus width of the data currently being transferred by the bus width of the transfer-requested data having the high order of priority, and allocates the system bus to the bus master issuing the transfer request having the high order of priority.

7. A system bus control apparatus according to claim 6, wherein the order of priority is allocated beforehand to the bus master or to the bus width variable section corresponding to the bus master.

8. A system bus control apparatus according to claim 6, wherein the order of priority is allocated depending upon the amount of the data requested to be transferred by the bus master.

9. An integrated circuit comprising:

a system bus that is a path of data transferred from a bus master;

a bus condition monitoring section that monitors a used condition or unused condition of the system bus;

a bus allocating section that allocates a bus width to be permitted to be transferred by the bus master based on the used condition or unused condition of the system bus monitored by the bus condition monitoring section, when the bus master issues a transfer request; and a bus width variable section that changes the bus width of the data transferred from the bus master in accordance with the allocated bus width, wherein the bus width variable section has a function of dividing the data from the bus master in accordance with the allocated bus width when the bus width of the data requested to be transferred by the bus master is greater than the bus width allocated by the bus allocating section, and of combining the data from the bus master in accordance with the allocated bus width when the bus width of the data requested to be transferred by the bus master is smaller than the bus width allocated by the bus allocating section.

10. A data processing system comprising:

a system bus that transfers data;

plural bus masters that are connected to the system bus, and have a buffer temporarily storing the data to be transferred and a bus width variable section changing a bus width; and a bus arbiter that is connected to the system bus, and has a bus condition monitoring section monitoring a used condition or unused condition of the system bus and a bus allocating section allocating a bus width permitted to be transferred by the bus master based on the used condition or unused condition of the system bus monitored by the bus condition monitoring section when the bus master issues a transfer request, wherein the bus width variable section has a function of dividing the data from the respective bus master in accordance with the allocated bus width when the bus width of the data requested to be transferred by the respective bus master is greater than the bus width allocated by the bus allocation section, and of combining the data from the respective bus master in accordance with the allocated bus width when the bus width of the data requested to be transferred by the bus master is smaller than the bus width allocated by the bus allocating section.

* * * * *